UNITED STATES PATENT OFFICE.

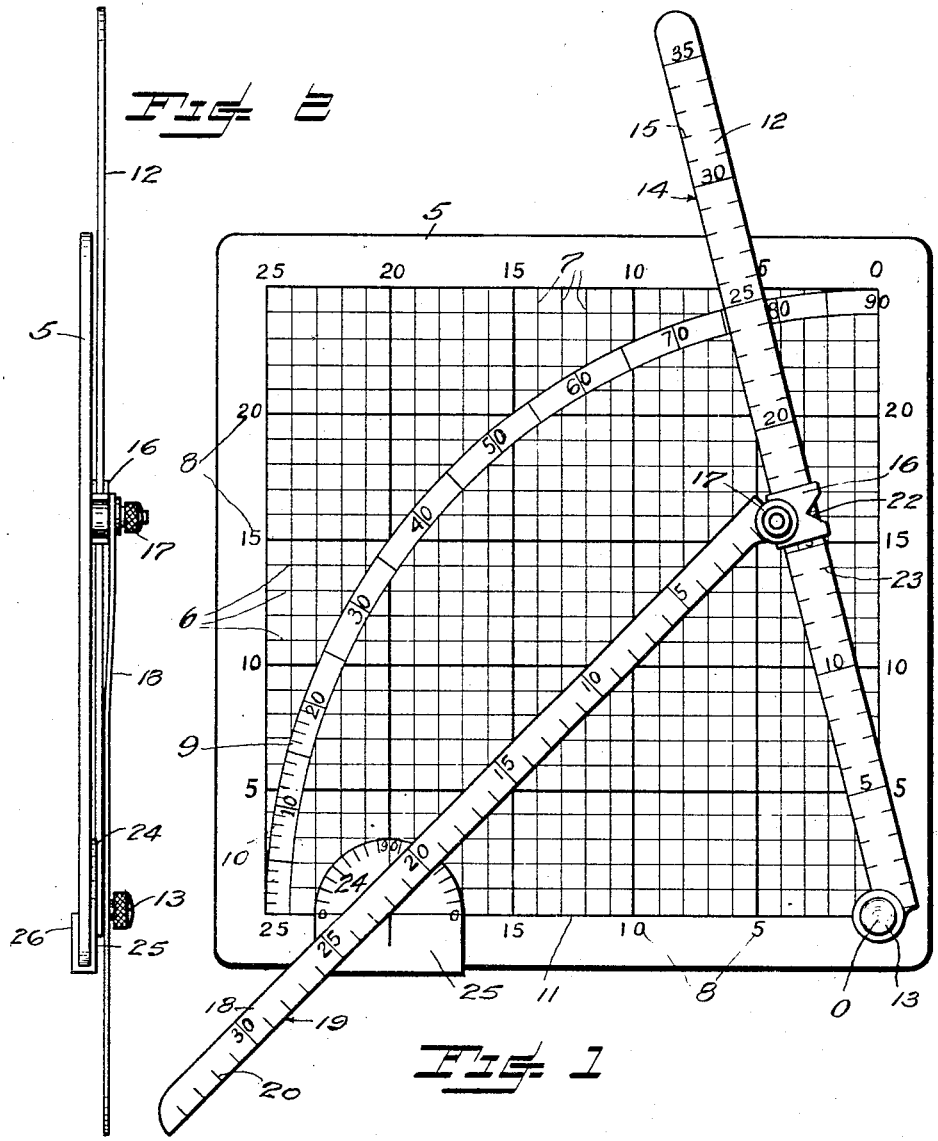

NELS L. CARLSON, OF BELLEVUE, WASHINGTON.

MEASURING DEVICE.

1,287,219. Specification of Letters Patent. Patented Dec. 10, 1918.

Application filed November 9, 1917. Serial No. 201,030.

*To all whom it may concern:*

Be it known that I, NELS L. CARLSON, a citizen of the United States, residing at Bellevue, in the county of King and State of Washington, have invented certain new and useful Improvements in Measuring Devices, of which the following is a specification.

This invention relates to measuring devices and is designed, more especially, for plotting surveys and for determining the courses and positions of marine vessels.

The object of the invention is to afford a simple and inexpensive device of this character whereby positions, lines and angles may be conveniently determined with accuracy and despatch.

To these ends, the invention consists in the novel construction, adaptation and combination of parts, as will be hereinafter described and claimed.

In the accompanying drawings, Figure 1 is a plan view of a measuring device embodying the present invention. Fig. 2 is a longitudinal elevation taken from the left-hand side of Fig. 1.

Referring to the drawings, the numeral 5 designates a rectangular board or base plate on which are inscribed transverse and longitudinal lines 6 and 7 spaced to conform to a suitable scale and indicated by numbers such as 8, laid off from a zero point adjacent to the lower right-hand corner of the plate, as represented by 0 in Fig. 1. Said plate is also provided with a quadrant 9 whose arc is concentric with the referred-to zero mark, said quadrant being marked off with a scale 10 of degrees whose zero mark is upon a base line 11 extending through the zero point 0.

An arm 12 is pivotally connected by a thumb screw 13 to the plate 5, the center of the pivot being at the zero point 0. The arm 12 is formed to have an edge 14 radial of the zero or pivot point 0 and laid off from the latter on such arm edge is a scale 15. Slidably mounted upon the arm 12 for movements longitudinally thereof is a hollow block 16 carrying a thumb-screw 17 whereby a second arm 18 is pivotally connected to the block.

The arm 18 is formed to have an edge 19 radial of the axis of the pivot screw 17, such axis being also disposed to be in the plane of the scale edge 14 of arm 12.

The arm 18 is provided with a scale 20 along the edge 19, the zero point thereof being at the axis of the pivot 17. The block 16 is provided with a sight aperture in the nature, preferably, of a notch 22 whereby scale markings 23 provided on the arm 12 may be read to determine the position of the block relative of the center of pivot 13.

Included in the invention is a protractor 24 connected to the lower edge of plate 5 for movements transversely thereof. As illustrated, the protractor 24 is formed on one leaf of a plate formed of spring metal which is folded to provide two leaves 25 and 26 between which the base plate 5 is embraced.

By the construction as above explained many problems may be readily worked out, and it will be found useful for a variety of purposes. As an example, in plotting, the direction and length of a side of a triangle is represented with respect to a base line, indicated by 11, by adjusting the block 16 upon arm 12 and regulating the angular position of the latter by using the appropriate degree mark on the protractor scale 10. The arm 20 is thereupon brought into position to have its edge 19 coincide with the scale mark upon the line 11; the scale on the arm 18 will then give the length of the remaining side of the triangle, one angle of the triangle being denoted by the position of the arm 12 with respect to the protractor 9, a second angle by employing the protractor 24 below arm 18, while the third angle is ascertained by subtracting the sum of the two protractor indicated angles from 180°.

What I claim, is—

1. In a device of the class described, a base plate having a protractor scale thereon, said plate being also provided with linear scales arranged transversely and longitudinally thereof, an arm provided with a scale along one of its edges, a pivot connecting the arm to said plate, the center of said pivot being disposed to be in alinement with the aforesaid scale edge of said arm and also at the zero point of both of said linear scales and also at the center of the protractor arc, a block slidably connected to said arm, a second arm having a scale along one edge thereof, and a pivot connecting the last named arm to said block, the center of this pivot being disposed in alinement with the scale edges of both of said arms and at the zero point of the scale of the second named arm, and a protractor formed of a folded plate of spring metal and engaging the said base plate by embracing the same and slidable transversely thereof.

2. A measuring instrument comprising a base plate having thereon a relatively non-movable protractor scale and provided with linear scales arranged transversely and longitudinally of the plate, a protractor connected to said plate for relative transverse movements, an arm provided with a scale along one of the edges, a pivot disposed at the center of said protractor scale connecting the arm to said plate, a second arm adjustably connected to the first named arm and having a scale thereon for measuring the distance between a selected point on the scale of the first named arm and the center of the movable protractor whereby the scales of said arms and the linear scale of said base plate may be employed to determine the lengths of the sides of a triangle whose angles are determined by means of both of said protractors.

Signed at Seattle, Washington, this 27th day of October, 1917.

NELS L. CARLSON.

Witness:
E. ARLITA ADAMS.